3,320,279
REACTION PRODUCT OF NAPHTHOLACTAMS AND INDOLE DERIVATIVES AS DYESTUFFS
Alfred Brack, Leverkusen, Germany, assignor to Farbenfabriken Bayer Aktiengesellschaft, Leverkusen, Germany, a corporation of Germany
No Drawing. Filed Aug. 8, 1963, Ser. No. 300,934
Claims priority, application Germany, Aug. 29, 1962, F 37,687
5 Claims. (Cl. 260—326.15)

The present invention relates to novel dyestuffs; more particularly it relates to dyestuffs of the formula

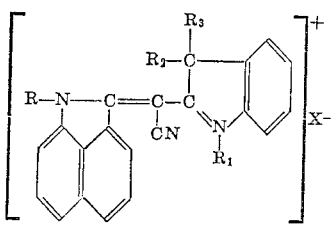

in this formula R stands for hydrogen or an alkyl, aralkyl, cycloalkyl or aryl radical, $R_1$, $R_2$ and $R_3$ stand for lower alkyl groups; X represents an acid radical used for salt formation of basic dyestuffs, and the aromatic rings as well as the radicals R and $R_1$, $R_2$ and $R_3$ may contain non-ionic substituents.

The new dyestuffs are obtained by reacting compounds of the general formula

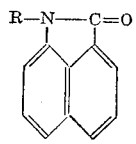   (I)

wherein R has the above-indicated meaning, and wherein the naphthalene rings may contain one or two non-ionic substituents, with indole derivatives of the general formula

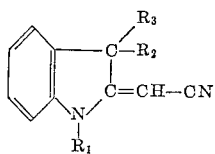   (II)

wherein $R_1$, $R_2$ and $R_3$ have the above meaning and wherein the nucleus may contain non-ionic substituents, and in the case where naphtholactam components (I) are used wherein R stands for hydrogen, the dyestuffs obtained in the form of the salts, are optionally converted into the corresponding bases and these are treated with quaternising agents R'X, wherein R' means alkyl, aralkyl or cycloalkyl.

Examples of non-ionic substituents with which the dyestuffes may be further substituted are halogen atoms such as fluorine, chlorine and bromine, lower alkyl and lower alkoxy groups such as methyl, ethyl, isopropyl, methoxy and ethoxy groups, and nitro and amino groups, acyl radicals and sulphonamide groups as well as non-ionic derivatives of carboxylic acid groups, such as carboxylic ester, carboxylic amide, and nitrile groups.

For carrying out the process for manufacture of the novel dyestuffs the reaction components (I) and (II) are heated in an inert diluent, such as benzene, toluene, chloroform, carbon tetrachloride, ethylene chloride, chlorobenzene, dichlorobenzene, dioxan or nitrobenzene, and an agent for splitting off water is added. As such the principal suitable examples are acid chlorides, such as phosphorus oxychloride, phosphorus trichloride, phosphorus pentachloride, thionyl and sulphuryl chlorides, phosgene or mixtures thereof. It is frequently advantageous to add Friedel-Crafts catalysts, such as aluminum chloride, zinc chloride, stannic chloride, ferric chloride or boron trifluoride. In general the reaction is conducted at temperatures between 20 and 150° C., but preferably between 60 and 130° C.

If component (I) is used in which R stands for hydrogen, the subsequent quaternisation of the dyestuffs obtained as salts, is expediently performed by dissolving the salts in a suitable solvent, such as water or alcohol, mixing the solution with excess alkaline agents, for example with aqueous or alcoholic caustic soda, caustic potash, soda or ammonia, isolating the separated dyestuff base, drying it in the usual way, then dissolving it in a dry solvent, e.g. in benzene, toluene, chloroform, sym.-tetrachloroethane or dimethyl formamide, and treating this solution at a temperature between 60 to 150° C., preferably 90 to 130° C., with a quaternising agent, for example with dimethyl sulphate, diethyl sulphate, p-toluenesulphonic acid methyl ester or methyl iodide.

Suitable compounds of the general Formula I are, for example, naphtholactam - (1,8), 4-chloro-naphtholactam-(1,8), 4-bromo-naphtholactam-(1,8), 2,4-dichloro-naphtholactam-(1,8), N-methyl-naphtholactam-(1,8), N-ethyl-naphtholactam-(1,8), N-n-propyl- or N-isoamyl-naphtholactam-(1,8), N-benzyl-naphtholactam-(1,8), N-phenyl - naphtholactam - (1,8), N-ethyl-4-chloro-naphtholactam - (1,8), N-ethyl-4-bromo- or N-ethyl-4-acetyl-naphtholactam - (1,8), N-ethyl-4-dimethylamino-naphtholactam-(1,8) and N-methyl-4-phenylazo-nahtholactam-(1,8).

Suitable compounds (II) are, for example, 1,3,3-trimethyl - ω - cyano-2-methylene-5-methoxy-dihydro-(2,3)-indole, 1,3,3 - trimethyl - ω - cyano-2-methylene-dihydro-(2,3)-indole, 1,3,3 - trimethyl - ω - cyano-2-methylene-5-chloro-dihydro-(2,3)-indole and 1,3,3-trimethyl-ω-cyano-2-methylene-dihydro-(2,3)-indole-5-carboxylic acid methyl ester.

The new dyestuffs are suitable for the dyeing, printing and bulk dyeing of synthetic or semi-synthetic materials, e.g. synthetic superpolyamides, and acetate rayon, cellulose materials such as paper, for the dyeing of leather as well as for application in rubber printing, for the production of writing pastes and fluids, but especially for the dyeing, printing and spin-dyeing of materials which consist wholly or predominantly of polymerised acrylonitrile and/or vinylidene cyanide. The dyeings and prints on the last-mentioned materials are distinguished by outstanding fastness properties, in particular fastness to light, washing, sublimation and decatising. The new dyestuffs possess a good affinity for these materials and yield deep shades.

The following examples are given for the purpose of illustrating the invention without, however, limiting it thereto; the parts given are parts by weight.

*Example 1*

22.8 parts of 1,3,3-trimethyl-ω-cyano-2-methylene-5-methoxy-dihydro-(2,3)-indole and 18.3 parts of N-methyl-naphtholactam-(1,8) are heated to 100° C. with 125 parts of chlorobenzene and mixed with 20 parts of phosphorus oxychloride. Stirring is continued to the end of the evolution of hydrogen chloride at 100–110° C. and the chlorobenzene is then distilled off under reduced pressure. The residue is recrystallised from 1000 parts of water with addition of charcoal. By salting out the filtrate, the dyestuff of the following formula is obtained:

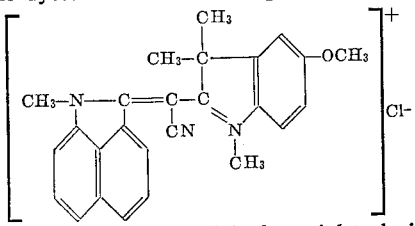

which gives outstandingly light-fast violet dyeings and prints on polyacrylonitrile.

*Example 2*

22.8 parts of 1,3,3-trimethyl-ω-cyano-2-methylene-5-methoxy-dihydro-(2,3)-indole and 17.0 parts of naphtholactam-(1,8) are heated to boiling with 120 parts of chloroform. 20 parts of phosphorus oxychloride are added dropwise, the mixture is kept at boiling for one hour, the chloroform is removed under reduced pressure and the residue recrystallised from 1000 parts of water with addition of 50 parts of glacial acetic acid and 2 to 4 parts of charcoal. The dyestuff of the following formula is obtained:

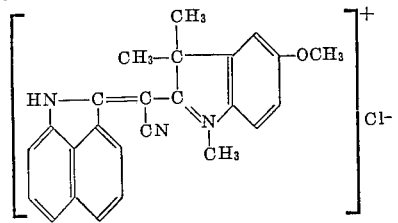

which dyes polyacrylonitrile in bluish-red shades. By treatment with alkalies, such as sodium hydroxide, soda or ammonia, the corresponding free base is obtained in the usual way, of the formula

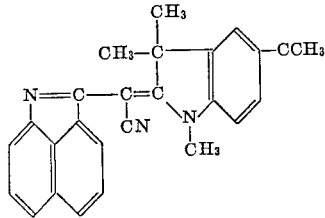

with a melting point of 218° C.

13.6 parts of this base are dissolved in 200 parts of benzene, 5 parts of dimethyl sulphate are added at 75° C., and the mixture is boiled for 45 minutes. The methosulphate corresponding to the dyestuff of Example 1 separates out.

Instead of the benzene, toluene of chlorbenzene, for example, can also be used as solvent for the dye base.

*Example 3*

19.8 parts of 1,3,3-trimethyl-ω-cyano-2-methylene-dihydro-(2,3)-indole and 19.7 parts of N-ethyl-naphtholactam-(1,8) are heated to 120° C. with 150 parts of chlorobenzene. 20 parts of phosphorus oxychloride are added dropwise, the temperature is maintained at 110–120° C. for 5 hours, the chlorobenzene is removed in vacuum and the residue crystallised from 1000 parts of water with addition of charcoal. The dyestuff of the following formula is obtained

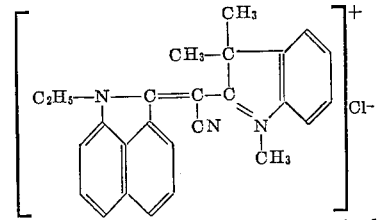

which dyes polyacrylonitrile in red-violet shades.

*Example 4*

19.8 parts of 1,3,3-trimethyl-ω-cyano-2-methylene-dihydro-(2,3)-indole and 17.0 parts of naphtholactam-(1,8) are stirred for one hour under reflux with 150 parts of ethylene chloride and 20 parts of phosphorus oxychloride. After distilling off the ethylene chloride and the excess phosphorus oxychloride, the dyestuff of the following formula is obtained

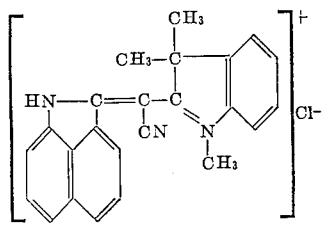

which dyes polyacrylonitrile in bluish red shades. The corresponding free base of the formula

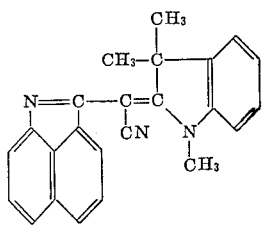

melts at 191° C. Upon treatment with dimethyl sulphate it yields the dyestuff of the formula

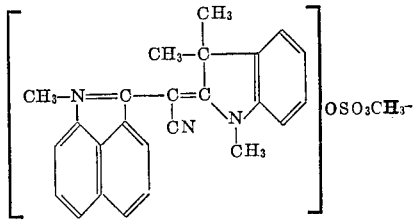

and with diethyl sulphate the ethyl sulphuric acid salt corresponding to the dyestuff of Example 3.

*Example 5*

6 parts of 1,3,3-trimethyl-ω-cyano-2-methylene-5-methoxy-dihydro-(2,3)-indole and 6 parts of 4-dimethylamino-N-ethyl-naphtholactam-(1,8) are stirred with 35 parts of phosphorus oxychloride for 90 minutes at 55–60° C. The phosphorus oxychloride is then removed under reduced pressure, the residue dissolved in 150 parts of water and the solution neutralised with a dilute sodium hydroxide or sodium carbonate solution. The dyestuff thus obtained can be purified by recrystallisation from water and corresponds to the formula

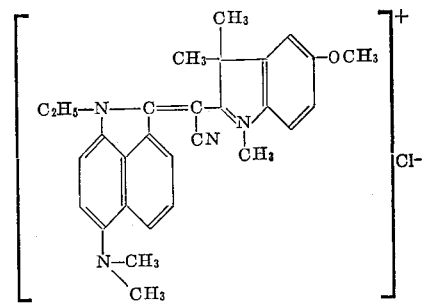

It dyes polyacrylonitrile in greenish blue shades.

If the equilavent amount of 4-bromo-N-ethyl naphtholactam is used instead of the dimethylamino-N-ethyl naphtholactam, the dyestuff of the formula

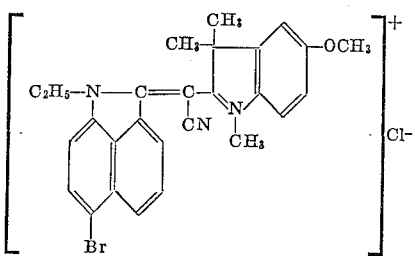

is obtained which dyes polyacrylonitrile in reddish blue shades.

I claim:
1. A dyestuff of the formula

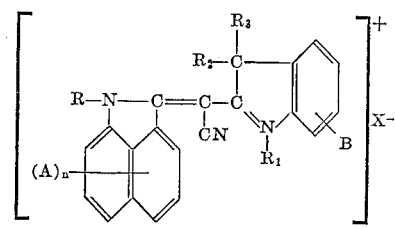

wherein R stands for a member selected from the group consisting of hydrogen, lower alkyl, benzyl and phenyl; $R_1$, $R_2$, and $R_3$ stand for a lower alkyl; X stands for the residue of an acid used for salt formation of basic dyestuffs; A stands for a member selected from the group consisting of hydrogen, chlorine, bromine, methyl, ethyl, lower alkyl-substituted amino, and phenylazo; B stands for a member selected from the group consisting of hydrogen, methoxy, ethoxy, chlorine, bromine, and carbo lower alkoxy; and $n$ stands for an integer ranging from 1 to 2.

2. The dyestuff of the formula

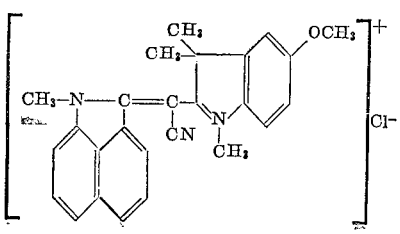

3. The dyestuff of the formula

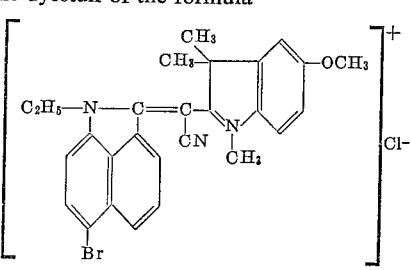

4. The dyestuff of the formula

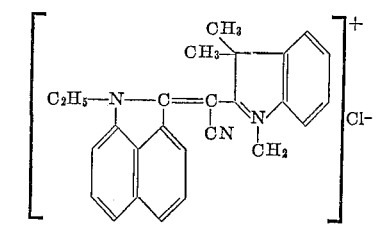

5. The dyestuff of the formula

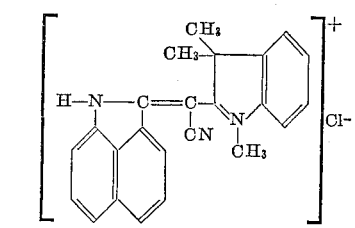

References Cited by the Examiner

UNITED STATES PATENTS 3,090,782   5/1963   Coenen et al. _____ 260—240.6

OTHER REFERENCES

Ficken et al.: J. Chem. Soc., 1960, pages 1529 to 1532 and 1535 to 1541.

Chemical Abstracts, volume 52, column 11427 (1958) (abstract of Dokunikhin et al.).

JOHN D. RANDOLPH, *Primary Examiner.*

UNITED STATES PATENT OFFICE
CERTIFICATE OF CORRECTION

Patent No. 3,320,279            May 16, 1967

Alfred Brack

It is hereby certified that error appears in the above numbered patent requiring correction and that the said Letters Patent should read as corrected below.

Column 1, line 57, "dyestuffes" read -- dyestuffs --; column 2, line 34, for "nahtholactam" read -- naphtholactam --; column 3, lines 37 to 46, for the right-hand portion of the formula reading
               $CCH_3$        read        $OCH_3$
column 5, line 1, for "equilavent" read -- equivalent --.

Signed and sealed this 28th day of November 1967.

(SEAL)
Attest:

Edward M. Fletcher, Jr.            EDWARD J. BRENNER
Attesting Officer                   Commissioner of Patents